United States Patent [19]

Nillesen

[11] Patent Number: 4,682,209

[45] Date of Patent: Jul. 21, 1987

[54] DIGITAL CHROMINANCE PROCESSOR WITH A PHASE AND FREQUENCY CONTROLLED DIGITAL OSCILLATOR INDEPENDENT OF THE STABLE OSCILLATOR FREQUENCY

[75] Inventor: Antonius H. H. J. Nillesen, Eindhoven, Netherlands

[73] Assignee: U.S. Philips Corporation, New York, N.Y.

[21] Appl. No.: 836,236

[22] Filed: Mar. 4, 1986

[30] Foreign Application Priority Data

Mar. 25, 1985 [NL] Netherlands .................. 8500864

[51] Int. Cl.$^4$ .................................. H04N 9/45
[52] U.S. Cl. .................................. 358/19; 358/13; 358/23
[58] Field of Search .................. 358/21 R, 23, 24, 40, 358/19, 13

[56] References Cited

U.S. PATENT DOCUMENTS 4,349,833 9/1982 Clarke .................................. 358/13

FOREIGN PATENT DOCUMENTS

| 3342181 | 3/1986 | Fed. Rep. of Germany .... 358/21 R |
| 103485 | 6/1982 | Japan .................................. 358/21 |
| 192190 | 11/1982 | Japan .................................. 358/40 |
| 183196 | 11/1982 | Japan .................................. 358/23 |
| 2148652 | 5/1985 | United Kingdom ............. 358/21 R |

Primary Examiner—John W. Shepperd
Attorney, Agent, or Firm—Thomas A. Briody; William J. Streeter; Gregory P. Gadson

[57] ABSTRACT

In a digital chrominance signal processing circuit for a chrominance signal which is sampled at a frequency equal to a number of times the chrominance subcarrier frequency, this frequency can be made variable, without switching to a different crystal frequency, by using a clock signal produced by a crystal oscillator (65) and a digital oscillator (71) which is controlled via a digital number (at 73) and whose quiescent frequency can be changed by changing a number to be applied to an input (95) of an adder circuit (85). Additionally, the adder circuit (85) is supplied with a number representing a control signal (at 88) and applies via its output (83) the frequency-determining digital number to an input (73) of the digital oscillator (71).

2 Claims, 1 Drawing Figure

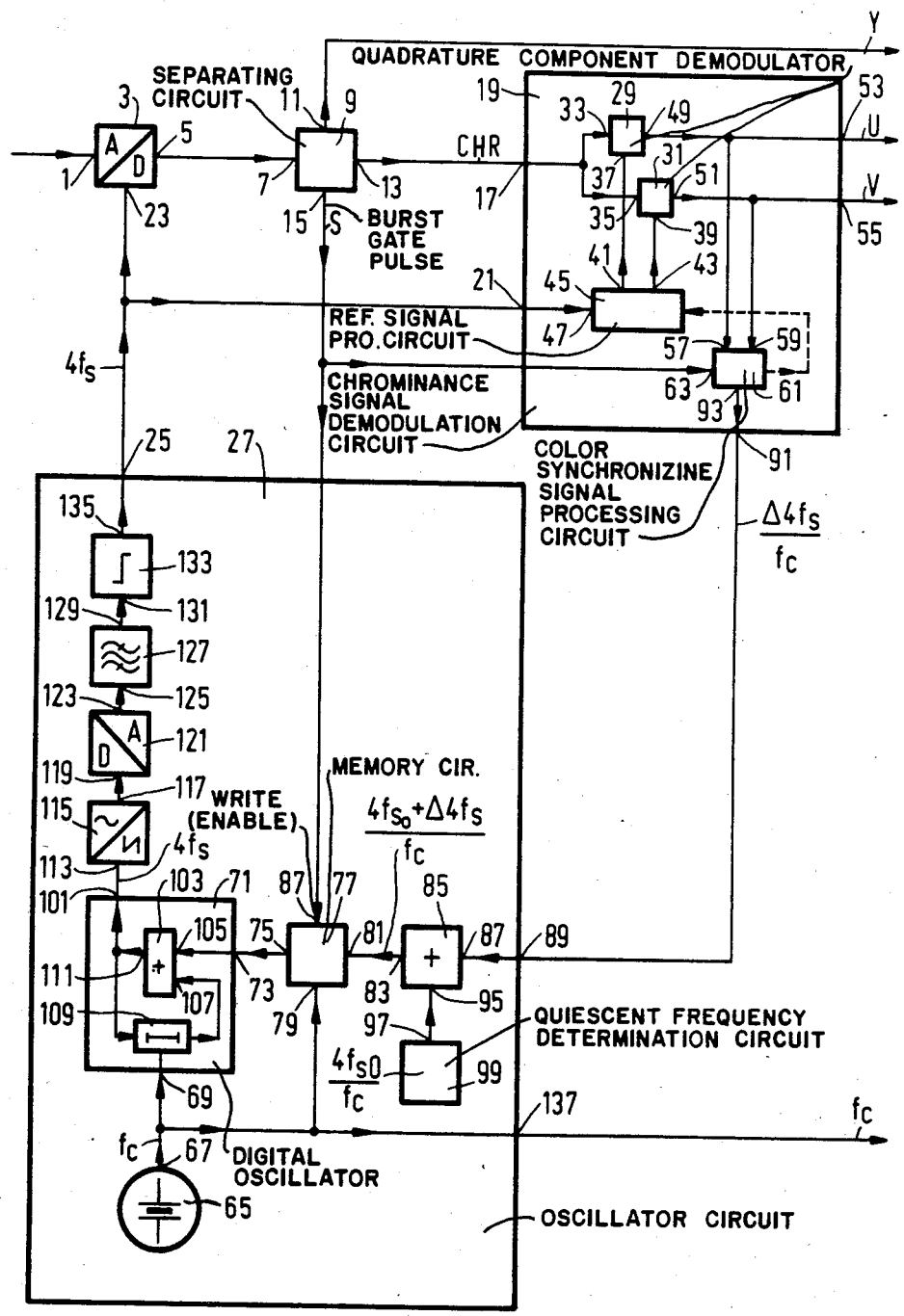

DIGITAL CHROMINANCE PROCESSOR WITH A PHASE AND FREQUENCY CONTROLLED DIGITAL OSCILLATOR INDEPENDENT OF THE STABLE OSCILLATOR FREQUENCY

The invention relates to a digital chrominance signal processing circuit an input of which is coupled at least via an analogue-to-digital converter to an input of a digital chrominance signal demodulation circuit having a reference signal input which, as is also a sampling signal input of the analogue-to-digital converter, is coupled to an output of an oscillator circuit comprising a stable oscillator and a digital-to-analogue converter and a control signal input of which is coupled to a control signal output of the chrominance signal demodulation circuit.

European Patent Application No. 0 067 899 discloses a digital chrominance signal processing circuit of the above-described type, whose stable oscillator in the form of a crystal oscillator produces a signal of four times the chrominance sub-carrier frequency. The digital-to-analogue converter converts a digital value which is a measure of the phase deviation of the crystal oscillator relative to a colour synchronizing signal in a chrominance signal to be processed, into an analogue control signal for the crystal oscillator.

When such a chrominance signal processing circuit is to be applied in a colour television receiver which must be suitable for processing different types of signals, such as, for example, PAL and NTSC, the quiescent frequency of the stable oscillator must be switchable, which implies that a plurality of different crystals must be available for the crystal oscillator.

The invention has for its object to provide a chrominance signal processing circuit in which one frequency of the stable oscillator and in the case of a crystal oscillator consequently only one crystal is sufficient.

According to the invention, a digital chrominance signal processing circuit of the type defined in the opening paragraph, is characterized in that the control signal input of the oscillator circuit is coupled via an adder circuit to a frequency-determining input of a digital oscillator a clock signal input of which is coupled to an output of the stable oscillator which is independent of the chrominance signal, whilst an output of the digital oscillator is coupled to the output of the oscillator circuit at least via the digital-to-analogue converter, whilst a further input of the adder circuit is coupled to a circuit for producing a digital number which determines the quiescent frequency of the digital oscillator.

Since the quiescent frequency of the digital oscillator can be selected by applying a suitably chosen digital number to the further input of the adder circuit, there is no need to change the frequency of the stable oscillator, which is usually constituted by a crystal oscillator, for changing the quiescent frequency. In addition to the fact that a cheaper construction of a multi-standard receiver is possible, this means that, as regards the oscillator circuit, the manufacturer needs only keep one type of crystal in stock for different types of single-standard receivers, when these receivers are equipped with a digital chrominance signal processing circuit according to the invention. Furthermore, the stable oscillator may now have a frequency which is also suitable for another function in the receiver, such as, for example, processing the teletext signal, tuning, or writing or reading memories.

The invention will now be described with greater detail by way of example with reference to the accompanying drawing, the only FIGURE of which illustrates by means of a block diagram a chrominance signal processing circuit according to the invention.

In the FIGURE, an analogue colour television signal to be processed, which in this case contains a chrominance signal, a luminance signal and a synchronizing signal is applied to an input 1 of an analogue-to-digital converter 3. A digital colour television signal which is applied to an input 7 of a separating circuit 9 is obtained from an output 5 of the analogue-to-digital converter 3.

The separating circuit 9 separates the different components of the colour television signal and supplies from an output 11 the luminance signal Y, from an output 13 the digital chrominance signal CHR and from an output 15 the synchronizing signal S. The output 13 of the separating circuit 9 is connected to an input 17 of a digital chrominance signal demodulation circuit 19 of which a reference signal input 21, as is also a sampling signal input 23 of the analogue-to-digital converter 3, is connected to an output 25 of an oscillator circuit 27. The output 25 of the oscillator circuit 27 produces a pulse signal of four times the chrominance subcarrier frequency.

The demodulation circuit 19 has a first and a second quadrature component demodulator 29 and 31, respectively, whose respective inputs 33 and 35 are connected to the input 17 of the demodulation circuit 19, respective reference signal inputs 37 and 39 to first and second outputs 41 and 43, respectively of a reference signal processing circuit 45 an input 47 of which is connected to the reference signal input 21 of the demodulation circuit 19.

Outputs 49 and 51, respectively of the respective first and second quadrature component demodulators 29 and 31 are connected to respective first and second outputs 53 and 55 of the demodulation circuit 19 and supplies therefrom a demodulated digital first and second quadrature component U and V, respectively. These components U and V are also applied to an input 57 snd 59, respectively of a colour synchronizing signal processing circuit 61, which has a gate signal input 63 to which the synchronizing signal S obtained from the output 15 of the separating circuit is applied. In a circuit for processing a PAL chrominance signal it is further possible, in known manner, that there is a coupling, denoted by means of a broken line, between the colour synchronizing signal processing circuit 61 and the reference signal processing circuit 45 for obtaining the appropriate phase change of the reference signal for the demodulator 31 for the V component.

The oscillator circuit 27 comprises a stable oscillator 65 which is in the form of a crystal oscillator and oscillates independently of the chrominance signal at a frequency $f_c$. An output 67 of the oscillator 65 is connected to a clock signal input 69 of a digital oscillator 71. This digital oscillator 71 has an input 73 for a digital number connected to an output 75 of a memory circuit 77 which is read at the frequency $f_c$ in response to a signal applied to a read signal input 79 and originating from the output 67 of the oscillator 65. The read digital number at the output 75 of the memory circuit 77 is derived from a number applied to an input 81 of the memory circuit, which number is obtained from an output 83 of an adder circuit 85 and which in response to a write signal applied to a write signal input 87 of the memory circuit 77 and obtained from the output 15 of the separating circuit 9, is entered into the memory circuit 77 after each occurrence of a colour synchronizing signal in the chrominance signal.

The digital number at the output 83 of the adder circuit 85 is the sum of a number $\Delta 4f_s/f_c$ applied to an input 88 thereof, which is obtained from an output 93 of the colour synchronizing signal processing circuit 61 via a control signal input 89 of the oscillator circuit 27, and a control signal output 91 of the demodulation circuit 19, and a number $4f_{so}/f_c$ applied to an input 95 of the adder circuit 85. This number $4f_{so}/f_c$ is supplied from an output 97 of a circuit 99 for producing a number which determines the quiescent frequency of the digital oscillator 71 and can be chosen in accordance with the chrominance subcarrier frequency $f_{so}$ of the chrominance signal to be processed and the desired number or times, so in this case four times, the chrominance subcarrier frequency, that the sampling signal frequency of analogue-to-digital converter 3 must be.

Consequently, the digital number $$\frac{4f_{so} + \Delta 4f_s}{f_c}$$

is applied, at a rate $f_c$, to the input 73 of the digital oscillator 71, in response to which at an output 101 thereof a sawtooth-shaped signal of the frequency $4f_s = 4f_{so} + \Delta 4f_s$ occurs, which is sampled at the frequency $f_c$.

The digital oscillator 71 comprises a modulo-one adder 103, an input 105 of which is connected to the input 73 of the digital oscillator 71 and a further input 107 is connected to an output 111 of the modulo-one adder 103 via a delay circuit 109 producing a time delay of one period duration of the signal applied at the frequency $f_c$ to the clock signal input 69.

The output 101 of the digital oscillator 71 is connected to the output 111 of the modulo-one adder 103 and applies the output signal of the digital oscillator 71 to an input 113 of a read-only memory (ROM) 115 which converts the sawtooth-shaped signal at its input 113 into a sinusoidal signal at its output 117, which signal is applied to an input 119 of a digital-to-analogue converter 121.

An output 123 of the digital-to-analogue converter 121 applies a predominantly sinusoidal signal at the frequency $4f_s$ to an input 125 of a filter circuit 127 which is in the form of an oscillator with phase-locked loop and supplies from its output 129 a sinusoidal signal of the frequency $4f_s$ from which other frequencies have been removed. An input 131 of a limiter circuit 133 receives this signal from the output 129 of the filter circuit 127 in response to which a pulse-shaped sampling signal is produced at an output 135, which is connected to the output 25 of the oscillator circuit 27, of the limiter circuit 133.

The control loop which leads from the control signal output 91 of the chrominance signal demodulation circuit 19 via the control signal input 89 of the oscillator 27, the output 25 thereof to the reference signal, input 21 of the chrominance signal demodulation circuit 19 causes the control signal $\Delta 4f_s/f_c$ at the control signal output 91 of the chrominance signal demodulation circuit 19 to be controlled such that the sampling signal at the input 23 of the analogue-to-digital converter 3 assumes the desired frequency $4f_{so}$.

The output signal of the crystal oscillator 65 can further be taken from an output 137 of the oscillator circuit 27, for example for use as a clock signal for a teletext display circuit or as a clock signal for a microprocessor. If so desired, the frequency $f_c$ can be coupled to the line frequency of a television receiver since that is a stable frequency. Coupling to an unstable frequency such as, for example, the line frequency of a signal displayed by a video recorder is not suitable for use. If the stability of a crystal oscillator can be accomplished in a different manner, the oscillator 65 may alternatively be structured thus.

When the luminance signal Y is not conveyed via the analogue-to-digital converter 3, the separating circuit 9 may of course be provided outside the signal path leading from the analogue-to-digital converter 3 to the chrominance signal demodulation circuit 19.

It will be obvious that the connections shown in the Figure may be multiple connections, depending on the number of bits to be conveyed through them, when a digital signal is involved. The control signal at the control signal output 91 of the chrominance signal demodulation circuit 19 can, for example, be transmitted in twenty bits, the output signal of the circuit 99 may have twenty-four bits, the signal at the input 73 of the digital oscillator 71 twenty-four bits, the signal at the output 101 thereof ten bits, the signal at the output 117 of the read-only memory 115 may contain, for example, seven bits and the signal at the output 5 of the analogue-to-digital converter 3 may have seven bits.

If a modulo-n adder is used as the adder 103, the numbers applied to the adder circuit 85 must be n times larger.

If so desired, the digital oscillator 71 may be of any other appropriate structure, possibly producing a waveform other than a sawtooth, when the circuit operates in a manner similar to the manner described in the foregoing.

The limiter circuit 133 may be omitted when the oscillator of the filter circuit 127 in the form of a phase-locked loop produces a signal suitable for use as a clock signal. The chrominance signal demodulation circuit 19, may, for example, be of a known construction, the mode of operation of such circuits may be assumed to be sufficiently known. The appropriate value of the number $\Delta 4f_s/f_c$ is obtained by an appropriate choice of the loop gain.

What is claimed is:

1. A digital chrominance signal processing circuit an input (1) of which is coupled at least via an analogue-to-digital converter (3) to an input (17) of a digital chrominance signal demodulation circuit (19) having a reference signal input (21) which, as is also a sampling signal input (23) of the analogue-to-digital converter, is coupled to an output (25) of an oscillator circuit (27) comprising a stable oscillator (65) and a digital-to-analogue converter (121) and a control signal input (89) of which is coupled to a control signal output (91) of the chrominance signal demodulation circuit, characterized in that the control signal input (89) of the oscillator circuit (27) is coupled via an adder circuit (85) to a frequency-determining input (73) of a digital oscillator (71) a clock signal input (69) of which is coupled to an output (67) of the stable oscillator (65) which is independent of the chrominance signal, whilst an output (101) of the digital oscillator (71) is coupled to the output (25) of the oscillator circuit (27) at least via the digital-to-analogue converter (121), whilst a further input (95) of the adder circuit (85) is coupled to a circuit (99) for producing a digital number which determines the quiescent frequency of the digital oscillator (71).

2. A digital chrominance signal processing circuit as claimed in claim 1, characterized in that the output (101) of the digital oscillator (71) is coupled to an input (119) of the digital-to-analogue converter (121) via a read-only memory (115), an output (123) of the digital-to-analogue converter being coupled to the output (25) of the oscillator circuit (27) via an oscillator having a phase-locked loop (127).

* * * * *